(12) United States Patent
Pit et al.

(10) Patent No.: US 7,268,966 B2
(45) Date of Patent: Sep. 11, 2007

(54) SYSTEM AND METHOD FOR ADJUSTING FLY HEIGHTS IN A HARD DISK DRIVE HAVING MULTIPLE HEADS

(75) Inventors: Remmelt Pit, Cupertino, CA (US); C. Singh Bhatia, San Jose, CA (US)

(73) Assignee: Hitachi Global Storage Technologies Netherlands, B.V., Amsterdam (NL)

( * ) Notice: Subject to any disclaimer, the term of this patent is extended or adjusted under 35 U.S.C. 154(b) by 0 days.

(21) Appl. No.: 10/957,012

(22) Filed: Sep. 30, 2004

(65) Prior Publication Data

US 2006/0066983 A1   Mar. 30, 2006

(51) Int. Cl.
G11B 21/02   (2006.01)
G11B 27/36   (2006.01)
G11B 33/14   (2006.01)

(52) U.S. Cl. .................. 360/75; 360/31; 360/97.02; 29/603.09

(58) Field of Classification Search ............ None
See application file for complete search history.

(56) References Cited

U.S. PATENT DOCUMENTS

| 6,144,178 | A | 11/2000 | Hirano et al. |
| 6,587,301 | B1 | 7/2003 | Smith |
| 6,914,742 | B1* | 7/2005 | Fioravanti et al. ............ 360/75 |
| 2003/0090832 | A1 | 5/2003 | Bernett et al. |
| 2003/0172520 | A1* | 9/2003 | Liu et al. ................ 29/603.03 |

FOREIGN PATENT DOCUMENTS

| JP | 52100220 | 8/1977 |
| JP | 60061966 | 4/1985 |
| JP | 61292289 | 12/1986 |
| JP | 62058484 | 3/1987 |
| JP | 62071082 | 4/1987 |
| JP | 62137790 | 6/1987 |

* cited by examiner

*Primary Examiner*—Andrew L. Sniezek

(57) ABSTRACT

A method for adjusting fly heights for a plurality of heads of a hard disk drive is disclosed. The method includes measuring respective magnetic and mechanical performance for the plurality of heads and varying the density of an environment within the hard disk drive. This variation of the environment is such that the respective fly heights of the plurality of heads are adjusted to achieve a preferred distribution with respect to an ideal fly height.

18 Claims, 11 Drawing Sheets

400

Begin

↓

Measure respective fly heights for the plurality of heads
410

↓

Measure the cumulative deviation of the respective fly heights of the plurality of heads from an ideal fly height
420

↓

Vary the density of the environment within the hard disk drive such that the respective fly heights of the plurality of heads are adjusted to achieve a preferred distribution with respect to the ideal fly height
430

SYSTEM AND METHOD FOR ADJUSTING FLY HEIGHTS IN A HARD DISK DRIVE HAVING MULTIPLE HEADS

RELATED ART

The present invention relates to a method for adjusting fly heights in a hard disk drive having multiple heads. In a magnetic storage system, such as a computer disk drive, digital information is magnetically stored upon the surface of a magnetic disk. The digital information is represented by selectively polarizing the magnetic field of consecutive areas across the surface of the rotating magnetic disk. When this information is read back from the disk, the magnetic polarization of the medium is sensed and converted into an electrical output signal. This polarizing and sensing of the representation of digital information on the disk is performed by a read/write head.

The method for manufacturing read/write heads for memory devices such as hard drive memory has evolved significantly over the past decade. The read/write head is deposited on sliders that are designed to "fly" or "soar" above a spinning disk at an appropriate height for the read/write head to function accurately. These sliders have aerodynamic features or "wings" on their air bearing surface (ABS) to allow them to fly at the appropriate height. This height, measured from the read/write head to the surface of the rotating disk, is known as the fly height. These features are generated by a photolithographic process on sliders that have been polished to an appropriate stripe height.

The sliders are attached to a suspension to form a Head Gimbal Assembly (HGA). The HGA comprises a suspension and a flexure carrying wires to connect the read/write head to the hard drive controller. This may be accomplished through aligning a series of solder pads on the main flex cable with a series of solder pads on the HGA and solder bonding them to provide a connection. The suspension part includes a spring load pushing the slider toward its affiliated disk. In nominal flying conditions, the spring load is exactly equal to the force generated by the air bearing pressure between the slider and the disk. The flexure on which the slider resides also imparts a moment to the slider, which again is compensated by the air bearing forces. One or multiples HGAs are then attached to the head stack assembly (HSA) which in turn is attached to the hard drive actuator.

Assembly tolerances in the manufacturing process, including but not limited to gram loads of the springs on the suspension, alignments during the HGA process and inaccuracies in the photolithographic processes, may lead to variations in fly heights from one disk to another in a multiple disk HSA. At the interface with its associated disk surface, the read/write head needs to be sufficiently close to achieve a good magnetic signal, and at the same time, sufficiently distant to achieve mechanical clearance from the disk.

As storage densities increase, the read/write heads need to be closer to the magnetic film on the disk, forcing sliders in current and future HDDs to fly closer and closer to the disk surface. Of particular importance, the tolerance on the fly height also needs to be reduced. At the same time, increased capacity for a given density is obtained by increasing the number of sliders and disks within an HDD. One method that has been proposed to tune the flying height within a finished HDD is to adjust the gram load on the individual HGA suspensions by laser heating. It is proposed that future HDDs may be sealed, in which case it would be difficult to perform such an adjustment.

SUMMARY

A method for adjusting fly heights for a plurality of heads of a hard disk drive is disclosed. The method includes measuring respective fly heights for the plurality of heads and varying the density of an environment within the hard disk drive. This variation of the environment is such that the respective fly heights of the plurality of heads are adjusted to achieve a preferred distribution with respect to an ideal fly height.

BRIEF DESCRIPTION OF THE DRAWINGS

FIG. 4 is a flowchart of a method for achieving a preferred distribution of fly heights among a plurality of heads in a hard disk drive, in accordance with one embodiment of the present invention.

DETAILED DESCRIPTION

Reference will now be made in detail to embodiments of the invention, examples of which are illustrated in the accompanying drawings. While the invention will be described in conjunction with the embodiments, it will be understood that they are not intended to limit the invention to these embodiments. Furthermore, in the following detailed description, numerous specific details are set forth in order to provide a thorough understanding of the present invention. In other instances, well known methods, procedures, and components have not been described in detail so as not to unnecessarily obscure aspects of the present invention.

Embodiments of the present invention include a system and method for adjusting fly heights in a hard disk drive having multiple heads. Embodiments of the present invention provide for achieving a preferred distribution of flying heights among the plurality of heads in a sealed, finished hard disk drive that has a controlled environment. The fly height of a slider having a read/write head is defined by the balance of forces between the suspension gram load and moment and the pressure created underneath the air-bearing surface (ABS) of the slider. The pressure underneath the ABS is strongly dependent on the density of the environment in which it resides.

By tuning the density of the gas used inside the drive, the fly heights may be adjusted. In one embodiment, the density of the controlled environment may be increased to increase the fly heights of the read/write heads to achieve a preferred distribution. In another embodiment, the density of the environment may be decreased to reduce the fly heights of the read/write heads in order to achieve a preferred distribution.

In a hard disk drive with multiple sliders, it is clear that a compromise needs to be found for the full population of sliders. This would not be an issue for drives with only one slider. Embodiments of the present invention provide for such a compromise.

Figure 3:
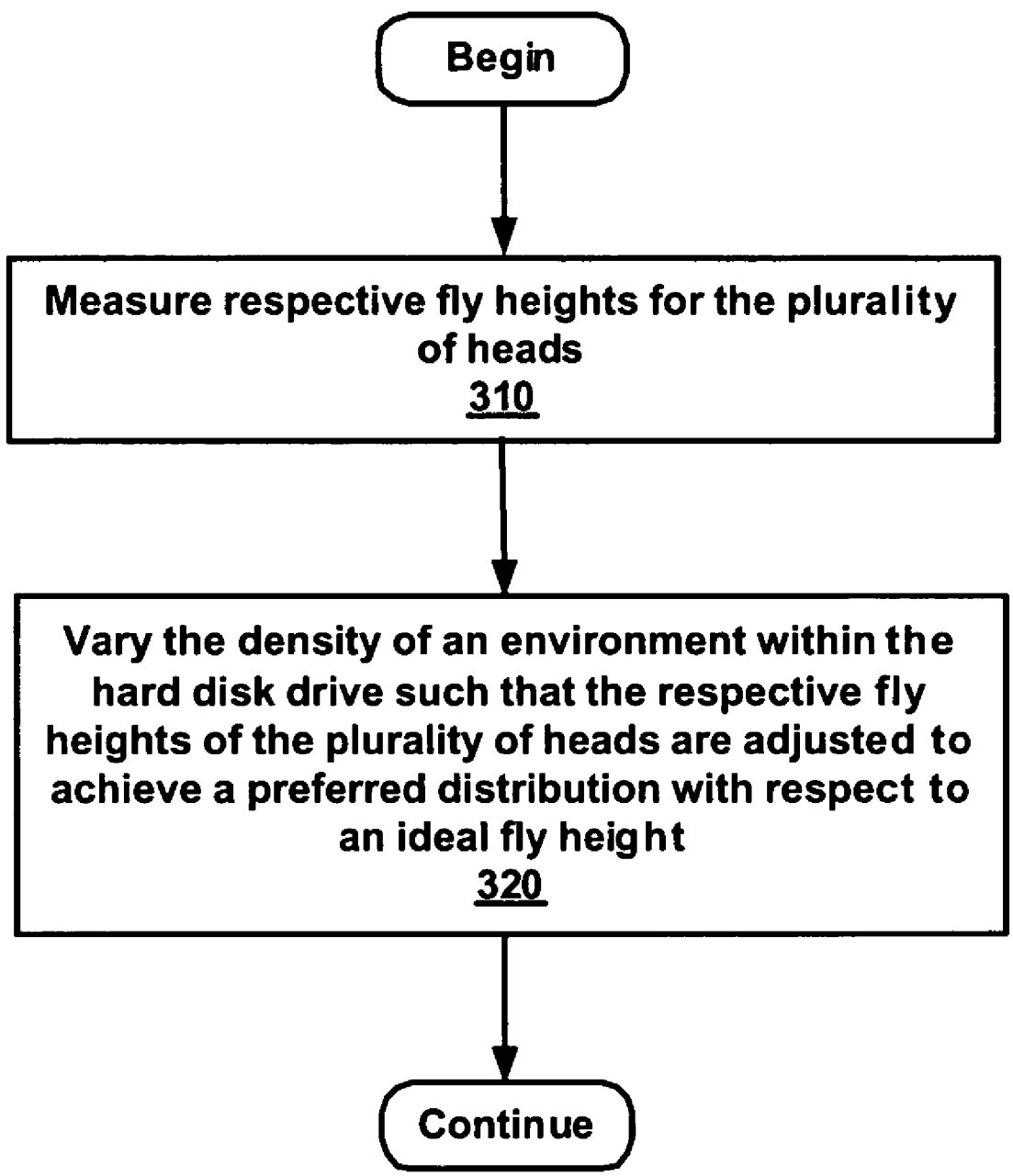
FIG. 3 is a flow chart of a method for adjusting fly heights for a plurality of heads of a hard disk drive, in accordance with one embodiment of the present invention.

Certain portions of the detailed descriptions of embodiments of the invention, which follow, are presented in terms of processes and methods (e.g., Method 300 of FIG. 3 and 400 of FIG. 4). Although specific steps are disclosed herein describing the operations of these processes and methods, such steps are exemplary. That is, embodiments of the present invention are well suited to performing various other steps or variations of the steps recited in the processes and methods herein.

Figure 1A:
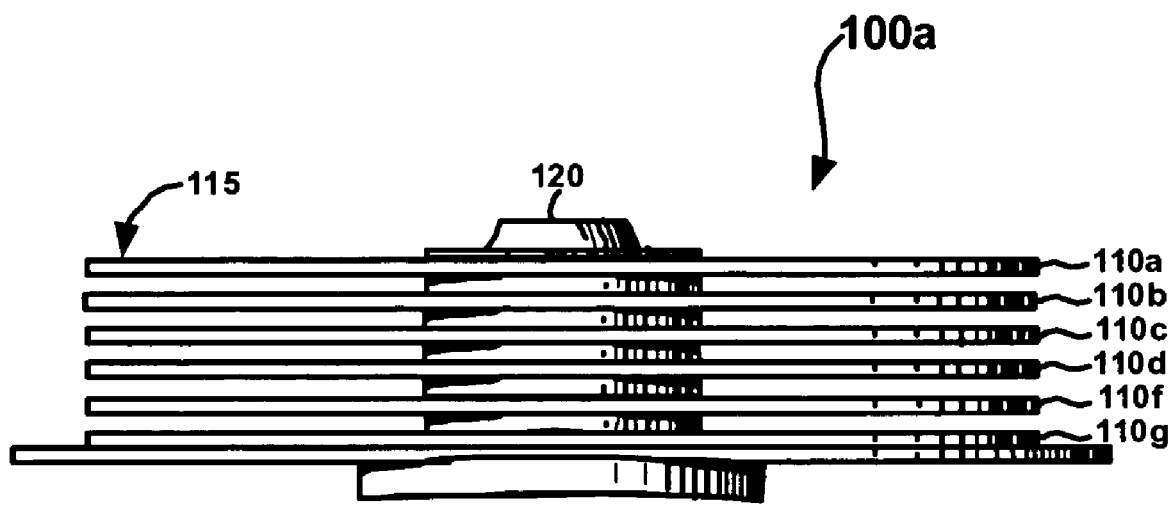
FIG. 1A is a partial side elevation view of a stack of magnetic disks, in accordance with one embodiment of the present invention.

FIG. 1A is a partial side elevation view of a stack of magnetic disks, or disk pack 100a, in accordance with one embodiment of the present invention. Disk pack 100a is shown to be residing on a spindle 120. According to one embodiment, the disk pack may contain a number of magnetic disks, typically four, five or six. As illustrated in the present embodiment, a disk pack may contain six disks, 110a, 110b, 110c, 110d, 110f and 110g. In a magnetic storage system, such as a computer disk drive, digital information is magnetically stored upon the surface 115 of magnetic disk 110a.

Figure 1B:
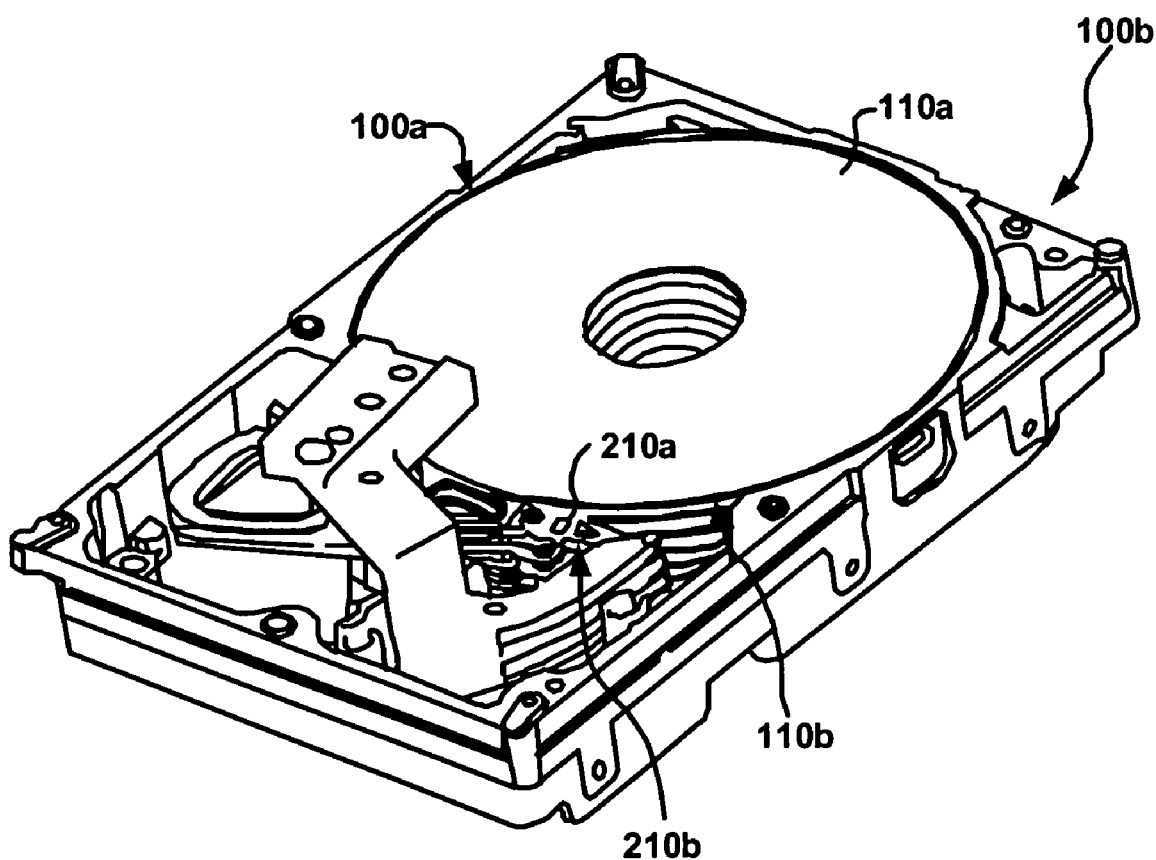
FIG. 1B is an isometric view of a typical hard disk drive assembly, in accordance with one embodiment of the present invention.

FIG. 1B is an isometric view of an HDA 100b, in accordance with one embodiment of the present invention. HDA 100b is shown with disk pack 100a loaded. It can be seen that there is a read/write head 210a for magnetic disk 110a and a read/write head 210b for magnetic disk 110b. HDA 100b has a read/write head for each magnetic disk in disk pack 100. Each read/write head, e.g. 210a is coupled to a recording channel. In other embodiments, HDA 100b may accommodate any number of magnetic disks, including a single disk.

Figure 2A:
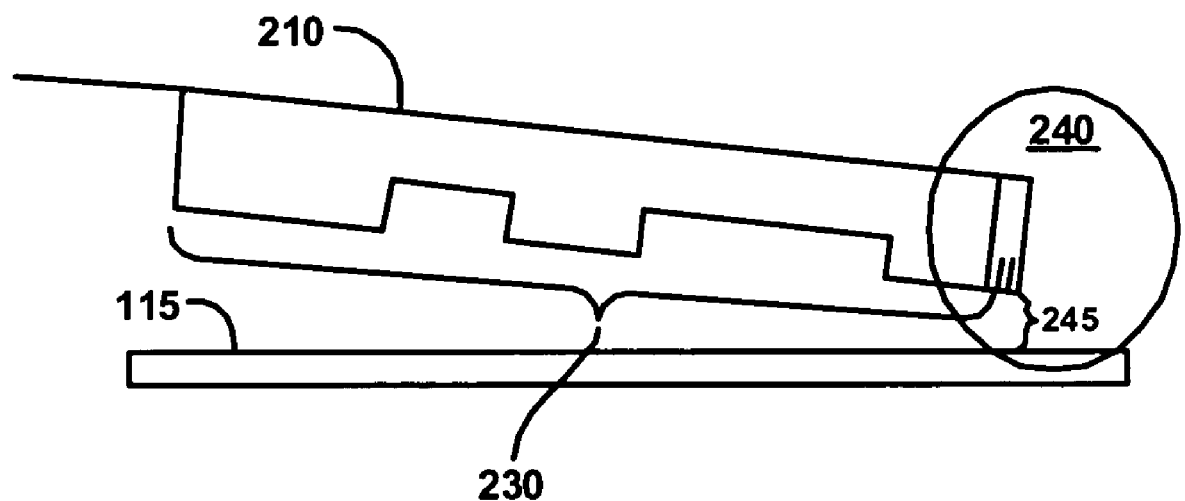
FIG. 2A is a side view of a slider with a read/write head, in accordance with one embodiment of the present invention.

FIG. 2A is a side view 200 of a slider 210 having a read/write head 240, in accordance with one embodiment of the present invention. The air-bearing surface (ABS) 230 rides above the read/write surface 115 of a disk. The height 245 at which read/write head 240 rides is known as the fly height.

Figure 2B:
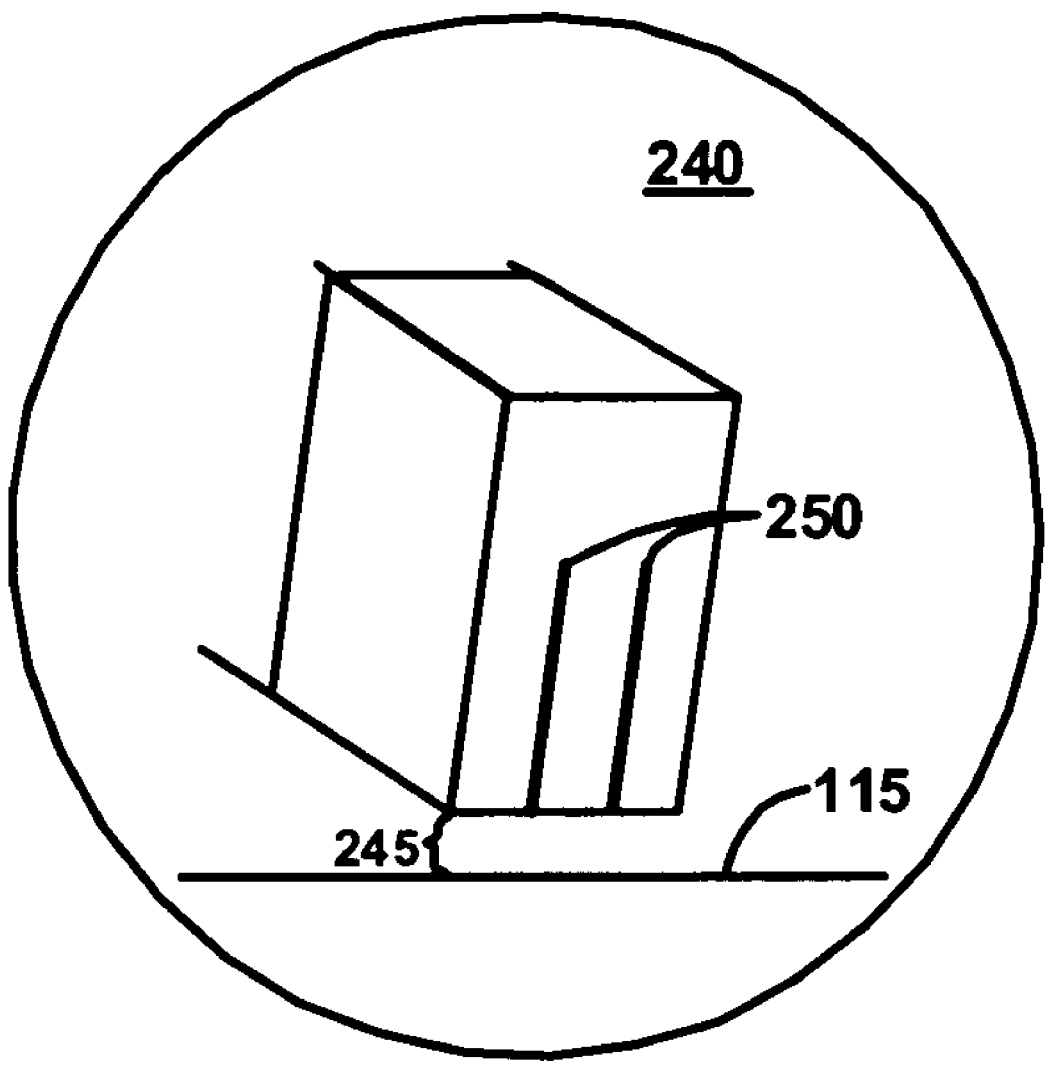
FIG. 2B is an expanded view of the read/write head of FIG. 2A, in accordance with one embodiment of the present invention.

FIG. 2B is an expanded view of read/write head 240 showing read and write elements 250 riding at a fly height 245 above the read/write surface 115 of a disk, in accordance with an embodiment of the present invention. The fly height 245 is defined by the balance of forces between the suspension gram load and moment of the head gimbal assembly and the pressure created underneath the air-bearing surface (ABS) 250 of the slider. The pressure underneath the ABS 250 is strongly dependent on the density of the environment in which it resides.

FIG. 3 is a flow chart of a method 300 for adjusting fly heights for a plurality of heads of a hard disk drive, in accordance with one embodiment of the present invention. Method 300 will be discussed in concert with method 400 of FIG. 4 and with FIGS. 5A, 5B, 6A and 6B below.

At step 310, according to one embodiment, respective fly heights for the plurality of heads in a hard disk drive are measured. This measurement may be made by a variety of methods. For example, in one embodiment the fly height may be measured by a readback signal versus air pressure. In another embodiment thermal protrusion actuation may be used to measure the fly heights. Any method that allows for determining the clearance between the read/write heads and the magnetic surface of the disks (fly heights) may be employed. Preferably, one measurement should give information on the magnetic performance of the read/write heads, and one measurement (which could be the same) should give information on the mechanical clearance. To improve magnetic performance, the fly height can be decreased. To improve mechanical clearance, the fly height can be increased. Only the magnetic information, or only the mechanical information can be used, or a weighed combination of both can be used.

At step 320 of method 300, in accordance with an embodiment of the present invention, the density of the environment within the hard disk drive is varied such that the respective fly heights of the plurality of heads are adjusted to achieve a preferred distribution with respect to an ideal fly height. The environment within the hard disk drive may be, according to one embodiment of the present invention, air. According to another embodiment the environment may be one of Helium. In other embodiments, the environment may be Krypton or Argon, or a mixture thereof, or one or more of any number of gases that would support the flying of a slider having a read/write head.

The ideal fly height may be, according to an embodiment of the present invention, a fly height that provides just a balance between being close enough to have an appropriate magnetic spacing for the read/write head to send and receive a good signal and far enough away to have adequate mechanical clearance so as not to interfere with adjacent features. Thus a preferred distribution may, according to one embodiment, be one that positions as many fly heights as close as possible to the ideal fly height. In another embodiment, the preferred distribution may be one that maintains all fly heights within a predefined range about the ideal fly height. The preferred distribution may be defined in any number of ways, depending on the number of disks in the hard drive, the design of the hard drive, the needs of a user of the hard drive, and the like. Therefore the present invention should not be limited to a single preferred distribution, but rather, to any distribution that may be defined as preferred based on its intended application.

FIG. 4 is a flowchart of a method 400 for achieving a preferred distribution of fly heights among a plurality of heads in a hard disk drive, in accordance with one embodiment of the present invention. Steps 410 and 430 of method 400 reiterate steps 310 and 320, respectively of method 300 above.

At step 420 of method 400, according to one embodiment, the cumulative deviation of the respective fly heights of the plurality of heads from an ideal fly height is measured. Step 430 may then be entered and the density of the environment varied so as to minimize this cumulative deviation. Refer now to FIGS. 5A, 5B, 6A and 6B for a further discussion of method 400. It should be understood that there may be other measurement methods, other than cumulative deviations, employed to aid in achieving a preferred distribution.

Figure 5A:
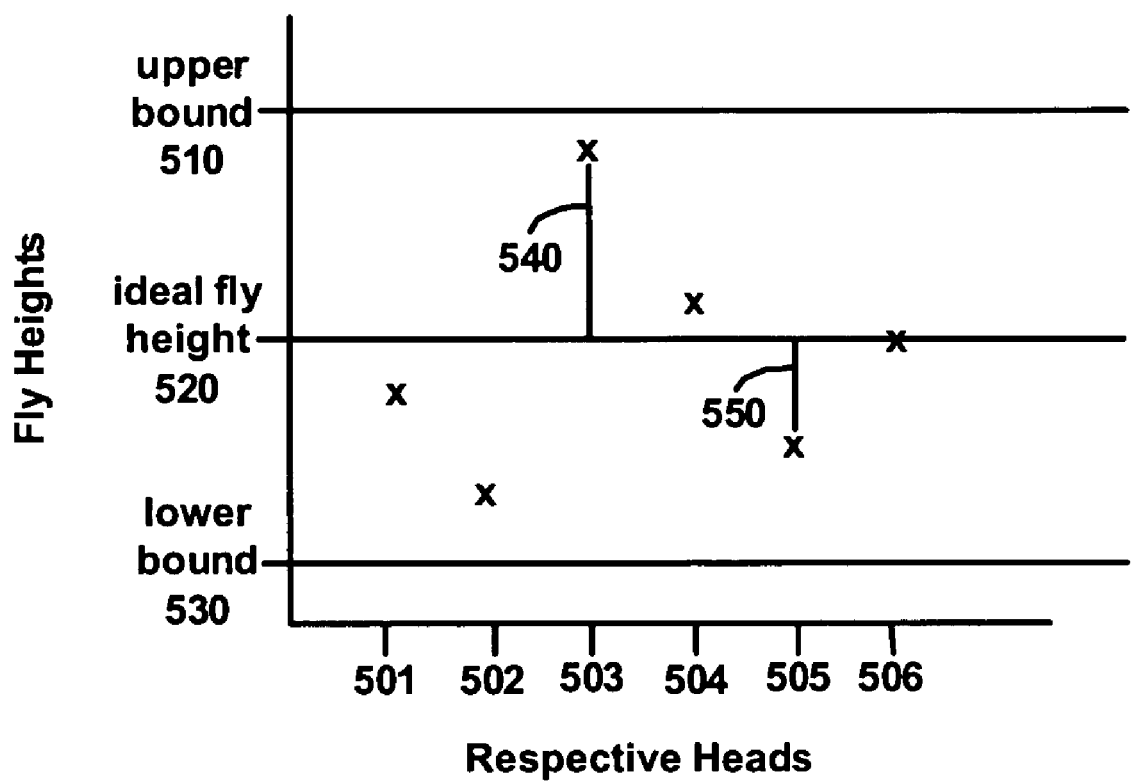
FIG. 5A is a graphical representation of a distribution of respective fly heights for multiple read/write heads in a multiple disk HDD, in accordance with one embodiment of the present invention.

FIG. 5A is a graphical representation 500a of a distribution of respective fly heights, represented by "x", for multiple read/write heads 501, 502, 503, 504, 505, and 506 in a multiple disk HDD, such as HDD 100b of FIG. 1B, in accordance with one embodiment of the present invention. In graphical representation 500a, heads 501, 502, 505 and 506 are shown to be flying lower than ideal fly height 520. This distribution is only representative of a typical distribution of fly heights that might be measured in a finished hard disk drive.

Deviations 540 and 550 represent the deviations of fly heights for respective heads 503 and 505 from ideal fly height 520. Upper bound 510 and lower bound 530 represent a predefined space in which the fly heights may vary and still meet requirements for sufficient magnetic signal and mechanical clearances.

According to one embodiment, the environment within the hard disk drive may be adjusted to minimize the cumulative deviations from ideal fly height for all respective read/write heads. To accomplish this, the density of gas in the disk drive may be adjusted to move the fly heights in a direction that would minimize the deviations. For example, increasing the density of the environment would adjust the respective fly heights upward. If the environment within the hard disk drive is one of Helium, a gas with a higher density, such as Krypton, for example, can be added to increase the flying heights. Table 1 below illustrates how flying heights may vary with some gases (data from ABS simulation). The theoretical change of fly height (FH) is very significant. Preliminary experiments with Helium and air confirm these magnitudes. By changing the gas from Helium to Krypton, the FH changes from 0.91 nm to 10.9 nm, a factor of more than 10. However, the shear forces also increase with an increase in density. Thus there is a balance that needs to be achieved between reliability requirements and power consumption requirements needed to overcome the shear forces and stay on track. This can be factored into the decision making process leading to step 320 or 430.

TABLE 1

|  | density Kg/m$^3$ | Minimum FH nm | X-shear gf | Y-shear gf |
| --- | --- | --- | --- | --- |
| Air | 1.225 | 5.97277 | 0.091 | −0.029 |
| He | 0.1785 | 0.910786 | 0.064 | −0.020 |
| Kr | 3.708 | 10.8957 | 0.114 | −0.037 |
| Ar | 1.784 | 7.04565 | 0.101 | −0.033 |

Figure 5B:
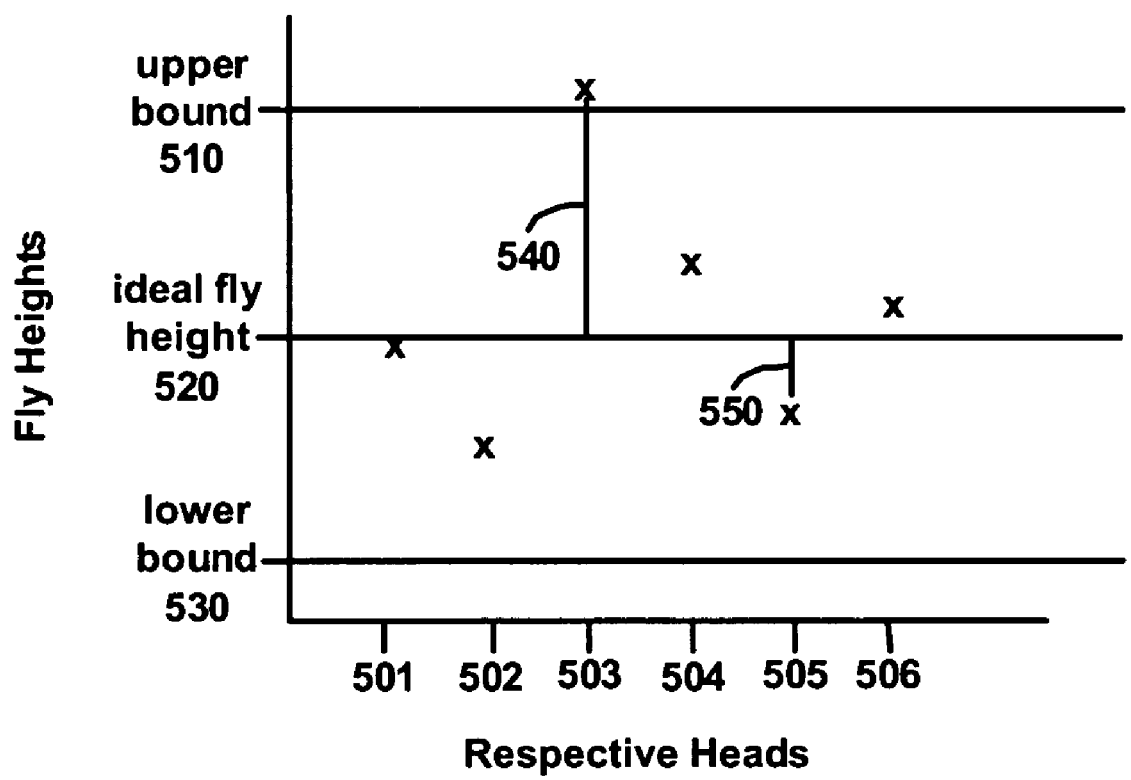
FIG. 5B is a graphical representation of an adjustment to the respective fly heights of FIG. 5A, in accordance with one embodiment of the present invention

FIG. 5B is a graphical representation 500b of an adjustment to the respective fly heights of FIG. 5A, in accordance with one embodiment of the present invention. In the present embodiment, the density was increased in order to minimize the cumulative deviations of the respective fly heights of all respective heads, including deviations 540 and 550 of heads 503 and 505, respectively, from the ideal fly height 520. In the present embodiment it may be seen that the density of the environment may be adjusted such that at least one of the respective fly heights falls outside a predetermined range, as defined by upper bound 510 and lower bound 530. The fly height of head 503 is shown to have exceeded upper bound 510 which may render head 503 unreliable. However, other factors related to the read/write head may leave the magnetic performance for head 503 acceptable. Such an adjustment may therefore be made discretionarily. According to another embodiment, the density of the environment may be varied within the hard disk drive such that all the respective fly heights are maintained within the predetermined range, even though the cumulative deviations of respective fly heights may not be minimized to an ideal level.

Figure 6A:
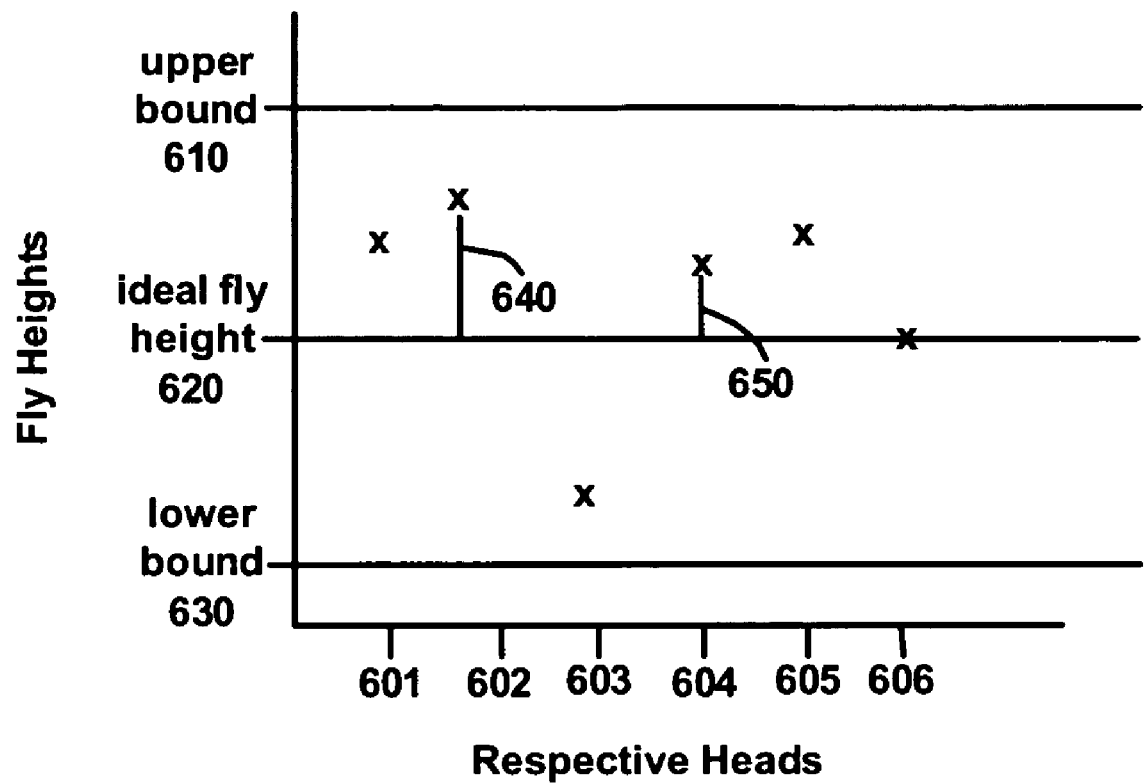
FIG. 6A is a graphical representation of a distribution of respective fly heights for multiple read/write heads in a multiple disk HDD, in accordance with another embodiment of the present invention.

FIG. 6A is a graphical representation of a distribution of respective fly heights of heads 601, 602, 603, 604, 605 and 606 for multiple read/write heads in a multiple disk HDD, such as HDD 100b of FIG. 1B, in accordance with one embodiment of the present invention. In graphical representation 600a, heads 601, 602, 604, 605 and 606 are shown to be flying higher than ideal fly height 620. This distribution is only representative of a typical distribution of fly heights that might be measured in a finished hard disk drive.

Deviations 640 and 650 represent the deviations of fly heights for respective heads 602 and 604 from ideal fly height 620. Upper bound 610 and lower bound 630 represent a predefined space in which the fly heights may vary and still meet requirements for sufficient magnetic signal and mechanical clearances. If the cumulative deviation of the fly heights of respective heads 601, 602, 603, 604, 605 and 606 is determined to be a large positive value, meaning the heads are flying higher than the ideal fly height, the density of the environment may be decreased (e.g., add an amount of Helium or some other gas with a lower density than the environment) to minimize the cumulative deviation.

Figure 6B:
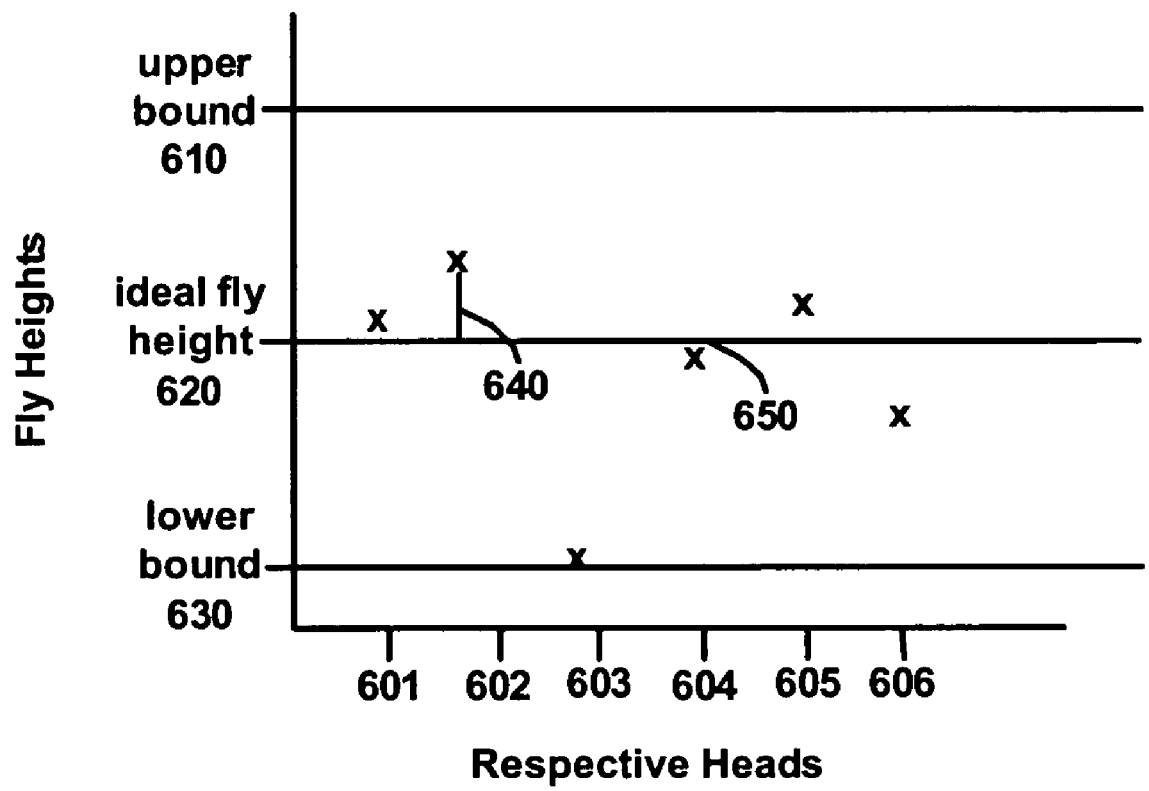
FIG. 6B is a graphical representation of an adjustment to the respective fly heights of FIG. 6A, in accordance with another embodiment of the present invention

FIG. 6B is a graphical representation of an adjustment to the respective fly heights of FIG. 6A, in accordance with another embodiment of the present invention.

Here the density of the environment within the hard drive has been varied such that all of the respective fly heights are maintained within the predetermined range defined by upper bound 610 and lower bound 630. However, in another embodiment the density of the environment may be, discretionarily, varied such that at least one of the respective fly heights falls outside the predetermined range.

Figure 7:
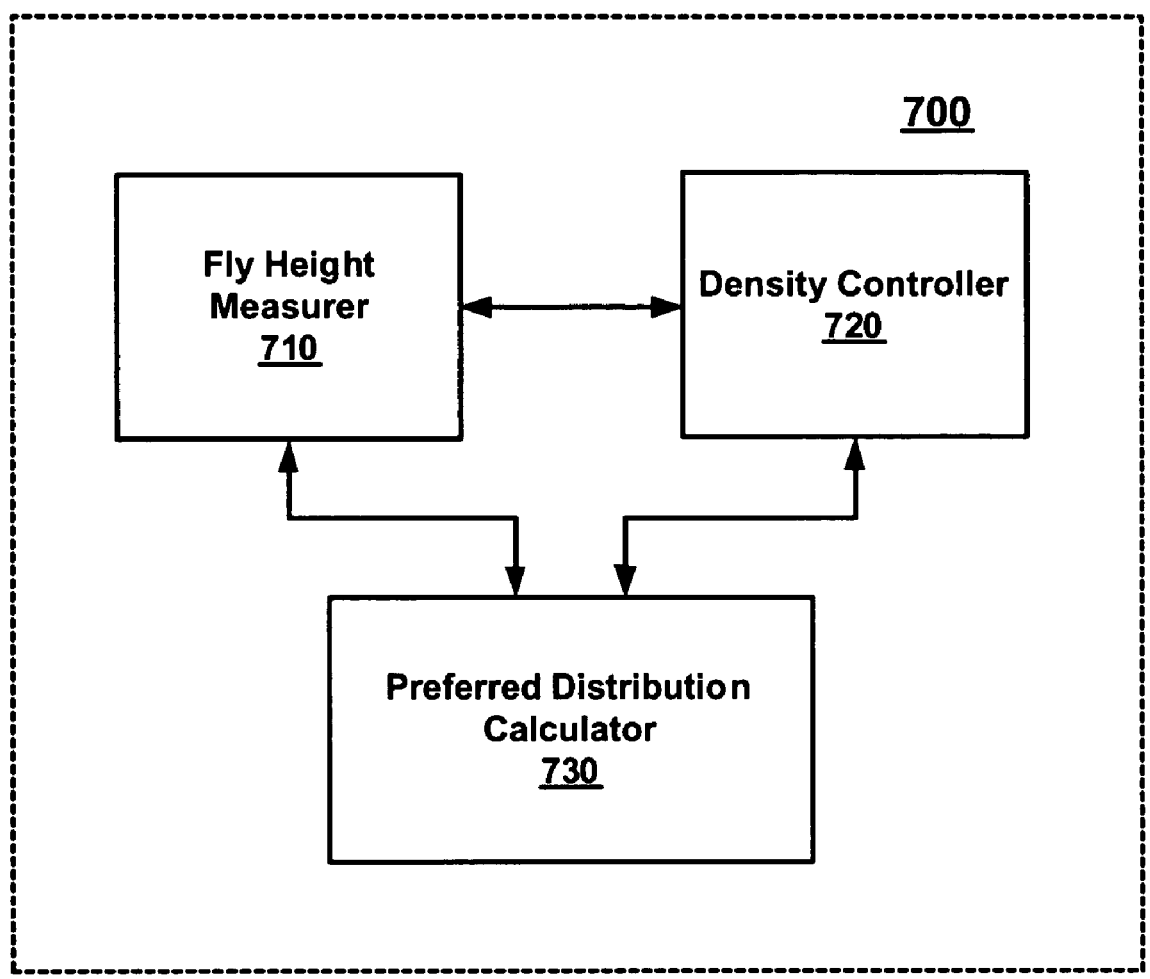
FIG. 7 is a block diagram of a system for measuring respective fly heights and adjusting them accordingly, according to one embodiment of the present invention.

FIG. 7 is a block diagram of a system 700 for measuring respective fly heights of a plurality of heads in a finished hard disk drive and adjusting them accordingly, according to one embodiment of the present invention. System 700 includes a multiple head performance measurer 710 for measuring the respective magnetic and mechanical performance of multiple heads in a hard disk drive. Multiple head performance measurer 710 may, according to one embodiment, comprise a device to measure a readback signal versus air pressure that may be translated to fly height. In another embodiment, performance measurer 710 may comprise thermal protrusion actuation to determine the fly height of the respective heads in a multiple head hard disk drive. Known magnetic criteria such as readback amplitude, pulse width at 50% (PW50) or overwrite may be used to qualify the magnetic performance.

A density controller 720 is coupled to multiple performance measurer 710 for varying the density of an environment within the finished hard disk drive, such that the respective fly heights (e.g., fly height 245 of FIGS. 2A and 2B) are adjusted to achieve a preferred distribution with respect to an ideal fly height (e.g., ideal fly height 520 of FIGS. 5A and 5B). Density controller 720 may, in one embodiment, vary the density of the environment such that a cumulative deviation of the respective fly heights of the plurality of heads from the ideal fly height, as calculated by a preferred distribution calculator 730, is minimized.

According to one embodiment, density controller 720 may increase the density of the environment to adjust the respective fly heights upward. According to another embodiment, density controller 720 may decrease the density of the environment to adjust the respective fly heights downward.

In one embodiment, density controller 720 may vary the density of the environment within the hard disk drive such that all respective fly heights are maintained within a predetermined range. In another embodiment, density controller 720 may vary the density of the environment within the hard disk drive such that at least one of the respective fly heights falls outside a predetermined range.

According to one embodiment, preferred distribution calculator 730 is coupled to density controller 720 for calculating a cumulative deviation of the respective fly heights of each of the plurality of heads from the ideal fly height. Preferred distribution calculator may receive the measured fly heights from performance measurer 710, either directly or through density controller 720, determine the cumulative deviation of the respective fly heights from the ideal fly height, and calculate a preferred distribution of fly heights. The preferred distribution can then be provided to density controller 720 for determining an amount to vary the density in the environment of the hard disk drive.

Thus, the present invention provides, in various embodiments, a system and method for adjusting fly heights in a hard disk drive having multiple heads with the intent of obtaining a preferred magnetic and mechanical performance. The foregoing descriptions of specific embodiments have been presented for purposes of illustration and description. They are not intended to be exhaustive or to limit the invention to the precise forms disclosed, and many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A method for adjusting fly heights for a plurality of heads of a hard disk drive, comprising:
    measuring respective fly heights for said plurality of heads;
    determining a cumulative deviation between said respective fly heights and an ideal fly height; and
    varying the density of an environment within said hard disk drive such that said respective fly heights of said plurality of heads are adjusted to achieve a distribution that reduces said cumulative deviation to a limit.

2. The method as recited in claim 1, wherein said cumulative deviation is minimized by said varying said density.

3. The method as recited in claim 1, wherein said varying said density of said environment within said hard disk drive comprises increasing the density of said environment to adjust said respective fly heights upward.

4. The method as recited in claim 1, wherein said varying said density of said environment within said hard disk drive comprises decreasing the density of said environment to adjust said respective fly heights downward.

5. The method as recited in claim 1, wherein said varying said density of said environment within said hard disk drive is such that all said respective fly heights are maintained within a predetermined range.

6. The method as recited in claim 1, wherein said varying said density of said environment within said hard disk drive is such that at least one of said respective fly heights falls outside a predetermined range.

7. A system for measuring respective fly heights of a plurality of heads in a finished hard disk drive, comprising:
    a multiple-head performance measurer;
    a preferred-distribution calculator coupled to said multiple-head performance measurer for calculating a cumulative deviation of said respective fly heights of each of said plurality of heads from said ideal fly height; and
    a density controller coupled to said multiple-head performance measurer for varying the density of an environment within said finished hard disk drive such that said respective fly heights are adjusted to achieve a distribution that reduces said cumulative deviation to a limit.

8. The system of claim 7, wherein said cumulative deviation is minimized by said density controller adjusting said respective fly heights.

9. The system of claim 7, wherein said density controller increases the density of said environment to adjust said respective fly heights upward.

10. The system of claim 7, wherein said density controller decreases the density of said environment to adjust said respective fly heights downward.

11. The system of claim 7, wherein said density controller varies said density of said environment within said hard disk drive such that all said respective fly heights are maintained within a predetermined range.

12. The system of claim 7, wherein said density controller varies said density of said environment within said hard disk drive such that at least one of said respective fly heights falls outside a predetermined range.

13. A method for achieving a distribution of fly heights among a plurality of heads of a hard disk drive, comprising:
    measuring respective fly heights for said plurality of heads;
    determining a cumulative deviation between said respective fly heights and an ideal fly height; and
    varying the density of an environment within said hard disk drive such that said respective fly heights of said plurality of heads are adjusted to achieve said distribution.

14. The method as recited in claim 13, wherein said varying said density of said environment further comprises varying said density such that said a cumulative deviation is minimized.

15. The method as recited in claim 13, wherein said varying said density of said environment within said hard disk drive comprises increasing the density of said environment to adjust said respective fly heights upward.

16. The method as recited in claim 13, wherein said varying said density of said environment within said hard disk drive comprises decreasing the density of said environment to adjust said respective fly heights downward.

17. The method as recited in claim 13, wherein said varying said density of said environment within said hard disk drive is such that all said respective fly heights are maintained within a predetermined range.

18. The method as recited in claim 13, wherein said varying said density of said environment within said hard disk drive is such that at least one of said respective fly heights falls outside a predetermined range.

* * * * *